United States Patent [19]

Lemon et al.

[11] Patent Number: 5,032,642
[45] Date of Patent: Jul. 16, 1991

[54] PHENOLIC RESIN COMPOSITIONS

[75] Inventors: Peter H. R. B. Lemon, Romsey; Derek W. Baker, Hedge End; John Ireland, Woolston, all of England

[73] Assignee: Borden, Inc., Columbus, Ohio

[21] Appl. No.: 511,750

[22] Filed: Apr. 20, 1990

Related U.S. Application Data

[63] Continuation-in-part of Ser. No. 466,615, Jan. 17, 1990, abandoned.

[30] Foreign Application Priority Data

Mar. 13, 1989 [GB] United Kingdom ............. 8905761
May 16, 1989 [GB] United Kingdom ............. 8911204

[51] Int. Cl.$^5$ .................... C08K 5/13; C08L 99/00; C08L 61/00; B22C 1/22
[52] U.S. Cl. ................................ 524/596; 524/740; 523/146; 523/147; 525/508; 528/219
[58] Field of Search ............. 523/146, 147; 524/596, 524/740; 525/508; 528/219

[56] References Cited

U.S. PATENT DOCUMENTS 4,010,163 3/1977 Hesse et al. ............... 524/596
4,939,188 7/1990 Gerber ........................ 524/596

Primary Examiner—John Kight, III
Assistant Examiner—Kathryne E. Shelborne
Attorney, Agent, or Firm—Venable, Baetjer, Howard & Civiletti

[57] ABSTRACT

A phenolic resin composition comprises an ester-curable phenol-aldehyde resin in alkaline aqueous solution wherein the phenol-aldehyde resin is a methylolated phenolic novolak resin. Preferably, during manufacture of the methylolated phenolic novolak resin, unreacted phenol is removed. The composition may be employed, for reaction with an organic ester hardener, as a binder in the production of foundry moulds and cores having high strength. The further incorporation of an aryloxy alcohol in the novolak resin binder additionally improves the final strength of products obtained by a gas curing technique using ester vapor, such as that of methyl formate.

43 Claims, 1 Drawing Sheet

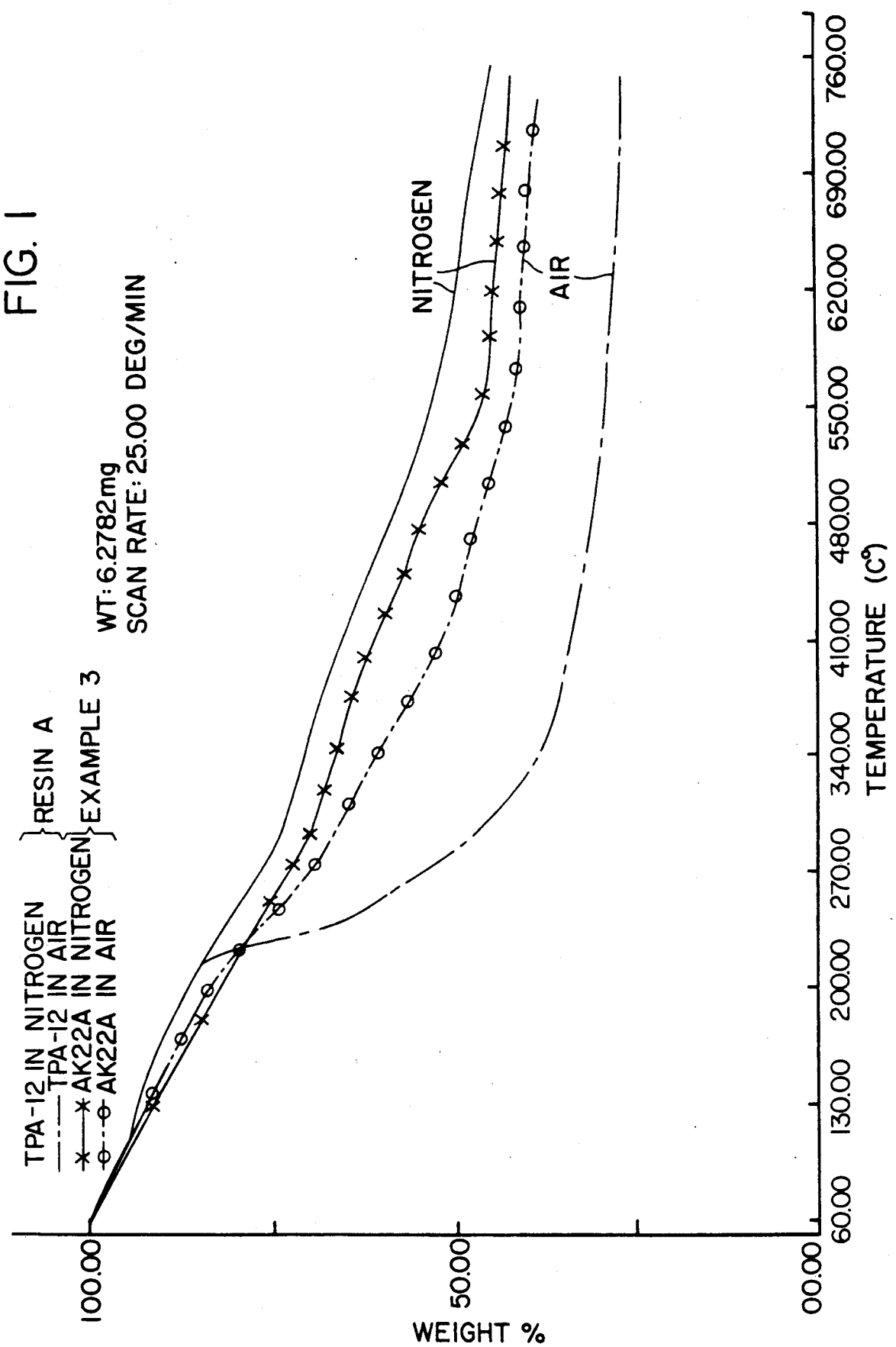

PHENOLIC RESIN COMPOSITIONS

This application is a continuation-in-part of Ser. No. 466,615 filed Jan. 17, 1990, now abandoned.

The present invention relates to phenolic resin compositions. More particularly, the present invention relates to compositions comprising, as a phenolic resin component, a methylolated phenolic novolak resin. The compositions have utility in the manufacture of foundry moulds and cores, in the production of phenolic foams, in casting, in laminating, in aggregate bonding and in other applications in which phenolic resins are conventionally employed.

Alkaline phenolic resole resins have found application as binders for particulate refractory materials, for example, in the bonding of sand to make moulds and cores for foundry use. Cold-setting processes of making foundry moulds and cores have been described in which esters are employed as a means of cross-linking alkaline phenolic resole resins for such applications. For example, European Patent Application 0027333 describes the use of compositions comprising lactones as hardeners. EP-A-0085512 describes the use of compositions comprising certain alkaline phenol-formaldehyde resole resins, a silane and an ester curing agent for the resin for making foundry moulds and cores. EP-A-0086615 describes a process for making foundry moulds and cores by passing the vapour of a volatile ester through sand mixed with a binder comprising a certain alkaline phenol-formaldehyde resole resin and a silane.

It is a particular advantage of these processes that, in the compositions described, undesirable elements, such as sulphur and nitrogen, which tend to have a deleterious effect upon casting finish and may give rise to casting defects, such as pinholing, are essentially absent. Consequently, the processes described produce castings characterised by high quality surface finish and relative freedom from casting defects, particularly in relation to ferrous metal castings.

Cold-setting processes for the manufacture of foundry moulds and cores employing acid catalysts are also known. Such processes commonly make use of phenolic resins or furane resins and employ acid catalysts, such as paratoluene sulphonic acid. However, the surface finish obtained with such acid-catalysed systems is generally inferior to that obtained with the above-described ester-cured, alkaline phenolic resole resin compositions. In addition, the acid-catalysed systems commonly give rise to more objectionable fume evolution on contact with molten metal. However, whilst the ester-cured alkaline phenolic resole compositions have certain advantages over these acid-catalysed systems it is a disadvantage of the ester-cured alkaline phenolic resole compositions that the strength of foundry moulds and cores produced from them is not always adequate.

It is an object of the present invention to provide an ester-cured, alkaline phenolic resin composition which overcomes this disadvantage and which, when used as a binder, is capable of giving higher strengths than those obtainable hitherto.

A further object of the invention is to eliminate or substantially reduce sticking, which frequently occurs as a problem in core production, particularly in the case of horizontally split boxes.

It is a further object of the present invention to provide a phenolic resin composition which is suitable for curing by gassing with a volatile organic ester to give cured products of high strength.

We have found that these objects can be achieved by using, as the ester-curable phenolic resin, a methylolated phenolic novolak resin.

Accordingly, the present invention provides a phenolic resin composition comprising an ester-curable phenol-aldehyde resin in alkaline aqueous solution and, as curing agent for the resin, an organic ester characterised in that the ester-curable phenol-aldehyde resin is a methylolated phenolic novolak resin.

Thus, it will be apparent that whereas the prior art ester curing systems use, as the ester-curable phenolic component, a phenolic resole resin the present invention makes use of a methylolated phenolic novolak resin as the ester-curable phenolic component. The ability of the compositions of the present invention to achieve higher strengths on curing compared to the prior art ester curing systems and the low sticking property of the compositions of the present invention derive from the use therein of a methylolated phenolic novolak resin.

The terms "phenolic resole resin" and "phenolic novolak resin" are, of course, terms of the phenolic resin art. Resoles are thermosetting, i.e. they form an infusible three-dimensional polymer upon the application of heat, and are formed by condensing a phenol with a molar excess of aldehyde in the presence of a basic catalyst. Phenolaldehyde novolak resins, on the other hand, are phenol ended chain polymers formed by the reaction of an aldehyde with a molar excess of a phenol typically in the presence of an acidic catalyst. These novolak resins are permanently fusible non-curing resins which may be cured into an insoluble, infusible resin upon reaction with a curing agent such as hexamethylenetetramine at elevated temperature.

The phenolic novolak resin may be made in any of the known ways. In order to obtain a resin having the properties of a novolak, that is to say, in order to obtain a product which does not thermoset upon heating, it is necessary to employ the phenol and the aldehyde in a molar ratio of less than 1 mole of aldehyde to each mole of the phenol.

The phenol used is preferably phenol itself or m-cresol or a mixture of phenol and m-cresol. Other phenols having unsubstituted ring positions ortho and para to the phenolic hydroxyl group, such as 3,5-xylen-1-ol and resorcinol, may be used to replace all or part of the phenol.

The preferred aldehyde used to make the phenolic novolak resin is formaldehyde, which is preferably used in the form of its aqueous solution. Other aldehydes, such as acetaldehyde and furfuraldehyde, or formaldehyde in the form of paraformaldehyde, may replace all or part of the formaldehyde.

The novolak resin may be prepared using any of the catalysts commonly employed for this purpose. Thus the novolak may be a conventional acid-catalysed novolak, in which the greater part of the phenolic nuclei are linked ortho-para or para-para, or may be a so-called "high ortho" novolak, in which there is preferential ortho-ortho linkage of the nuclei and which are prepared using an ortho-directing catalyst, although we have found that the high ortho novolaks are generally less satisfactory. Suitable acid catalysts include the strong mineral acids, such as sulphuric, phosphoric and hydrochloric acids, and organic acids, such as oxalic and salicylic acids or anhydrides, such as maleic anhydride. Suitable ortho-directing catalysts include salts of bivalent metals, such as zinc acetate and zinc borate.

As stated above, the phenol and the aldehyde are reacted together in a molar ratio of less than 1 mole of aldehyde to each mole of the phenol. In general, the aldehyde will not be used in a molar ratio to phenol of less than 0.3:1. Preferably, however, the aldehyde used is formaldehyde and we prefer to use formaldehyde in an amount in the range of from 0.3 to 0.88, more preferably from 0.4 to 0.88, mole per mole of the phenol. Amounts of formaldehyde in excess of the maximum ratio indicated will tend to cause premature gelation of the resin. In the case of the high-ortho novolaks, the maximum useful ratio is about 0.75 mole of formaldehyde per mole of phenol and we prefer not to exceed 0.72 mole. In either case, proportions of formaldehyde below about 0.3 mole per mole of phenol are uneconomic and unnecessary because of the increased level of phenol that remains unreacted.

In preparing a high ortho novolak, an ortho directing catalyst, such as a salt of a bivalent metal, is typically employed in a proportion of from 0.1 to 5, usually from 0.4 to 1.2, parts for every 100 parts of the selected phenol by weight on an anhydrous basis.

In the case of an acid-catalysed novolak resin, it is only necessary to employ sufficient of the acidic material to obtain a satisfactory rate of resinification and the proportion required will vary with the type of acid used. In the case of the strong mineral acids, such as sulphuric acid or hydrochloric acid, this will generally be in the range of from 0.02 to 1.0%, and preferably from 0.1 to 0.6%, by weight based on the weight of the phenol employed. With organic acids, such as oxalic acid or maleic anhydride, it is typical to use amounts in the range of from 0.1 to 10%, and preferably from 1 to 5%, by weight based on the weight of the phenol employed.

Methods for the preparation of acid-catalysed novolak resins are well known and are described, for example, in GB 1,210,239 and in GB 1,391,420.

The high-ortho phenolic novolaks referred to herein may be prepared in any of the known ways. We prefer, however, to employ, as catalysts in their preparation, salts of divalent electropositive metals, such as zinc acetate, zinc borate, manganese borate, nickel borate, calcium acetate, manganese acetate, lead acetate and zinc benzoate. The method of preparation of high-ortho resins by the use of such salts as catalysts is amply described in GB 757,392, GB 966,678 and GB 1,114,004.

The novolak resins formed, whether they be acid-catalysed or high ortho resins, are treated, when the reaction is substantially complete, to remove unreacted phenol. This may most conveniently be accomplished by steam distillation, but other methods of removing unreacted phenol, such as precipitation of the resin from solution and washing of the precipitate prior to drying, may be employed. It will be clear that the benefits of the invention will not be achieved in full measure if substantial amounts of free phenol are left in the resin. On the other hand, it is generally uneconomic and impractical to remove all traces of free phenol from the resin. We have found, however, that a substantial improvement in strength is achieved if the greater part of the unreacted phenol is removed.

The composition of the present invention employs, as an ester-curable phenolic component, a methylolated phenolic novolak resin. By the term "methylolated phenolic novolak resin", we mean that the phenolic novolak resin is provided, by chemical reaction, with free methylol groups, i.e. hydroxymethylene groups, attached to at least some of the aromatic nuclei in the novolak resin. The means by which the phenolic novolak resin can be methylolated will now be described.

After the phenol removal stage described above, the novolak resin is rendered alkaline and methylolated by reaction with formaldehyde. Methylolation is accelerated by elevated temperatures and, since the resin is capable of advancing under the conditions prevailing at this stage, we prefer to employ a methylolation temperature which is not in excess of 80° C. Conveniently, the methylolation reaction is carried out at a temperature between 50° C. and 70° C. The progress of methylolation may be checked by removing samples at intervals and determining the free formaldehyde content. The reaction may be terminated by cooling when the free formaldehyde has fallen to a suitable level. For convenience, the free-formaldehyde determination may be replaced by a viscosity determination, once the conditions for a given resin have been established. Generally, the reaction will be complete after about 2-3 hours.

The alkali used to dissolve the novolak resin may be of any of the alkali metal hydroxides, such as lithium, sodium or potassium hydroxide or their mixtures. The preferred alkali is potassium hydroxide.

The amount of alkali employed will depend, to some extent, on the acidity of the novolak, but should generally be sufficient to provide between 0.4 and 1.2 moles and preferably between 0.6 and 0.8 moles of alkali hydroxide per mole of phenol. If required, a smaller amount of alkali may be employed to effect the methylolation step and additional alkali added at a subsequent stage prior to use.

The methylolated novolak resin, in alkaline aqueous solution, thus produced may be cured by reaction with an organic ester. Examples of organic esters useful as the curing agent in the present invention include low molecular weight lactones, e.g. butyrolactone, propiolactone and caprolactone, carboxylic acid esters such as diacetin, triacetin, ethylene glycol diacetate, propylene glycol diacetate, butylene glycol diacetate, and organic carbonates such as propylene carbonate. These ester curing agents may be used singly or in combination. It is also possible to employ a low boiling point ester, such as methyl formate, in the form of a gas, vapour or aerosol to effect curing of the methylolated phenolic novolak resin, as described in EP-A-0086615. Additionally, if a gas curing technique is employed, a liquid ester of the type described above may also be incorporated into the composition to be cured.

We have found that, when used for the production of moulds and cores by a gassing process, in which the vapour of a volatile or volatilisable ester, usually methyl formate, is passed through a mould or core composition employing the methylolated phenolic novolak resin in alkaline aqueous solution as binder for sand or other granular refractory material, greater strengths are achieved if an aryloxy alcohol is incorporated in the composition. Thus, in a further aspect, the present invention provides a phenolic resin composition suitable for curing by gassing with a volatile organic ester comprising a methylolated phenolic novolak resin in alkaline aqueous solution and from 1% to 20% by weight based on the weight of the methylolated novolak resin of an aryloxy alcohol.

Suitable aryloxy alcohols include, for example, phenoxy ethanol, phenoxy propanol and methylphenoxy ethanol. Preferably, the aryloxy alcohol is 2-phenoxyethanol.

The aryloxy alcohol is preferably added to the methylolated novolak resin in an amount in the range of from 2% to 10% of the weight of the methylolated novolak resin but some improvement in properties is exhibited by amounts as low as 1%. Amounts in excess of about 20% are generally uneconomic and unnecessary.

After mixing, the resin/sand composition may be formed into the required shape by packing into a suitable mould or corebox and cured by passing ester vapour, optionally in a current of carrier gas and generated using a generating apparatus known per se, through the mould or corebox provided for this purpose with gassing inlet and exhaust vents. This process is described in more detail in European Patent 0086615. The composition may also contain a liquid ester or carbonate, if desired, as mentioned above.

The compositions described above may also comprise other additives to enhance or modify the properties of the mixture and/or the properties of the final cured composition. For instance, an aminosilane may be incorporated in amounts known generally in the art to improve the strength of the bond to sand.

The invention will be further illustrated by the following examples in which all parts are by weight basis unless otherwise indicated.

EXAMPLES 1-3

Manufacture of an Acid-catalysed Phenolic Novolak Resin 6110 parts of 100% phenol were charged to a jacketted vessel equipped with stirrer, reflux and distillate condensers, steam heating, water cooling and vacuum and heated under reflux to 80° C. 138 parts of salicyclic acid and 94 parts of a 24 percent w/w aqueous solution of sulphuric acid were then added. 2339 parts of 50% w/w aqueous formaldehyde solution were then introduced slowly over 90 minutes while maintaining reflux conditions at atmospheric pressure, using a minimum of steam in the later stages to maintain gentle reflux. After completion of the formaldehyde addition, steam was supplied to the vessel to maintain gentle refluxing for a further 90 minutes.

Distillate was then removed at atmospheric 1 pressure until the temperature rose to 110° C.

Vacuum was then gradually applied, building up to 28 inches of mercury ($-980$ mbar guage) while maintaining full steam heating. These conditions were maintained until the temperature reached 150° C. and then held for a further 15 minutes.

Steam distillation was then carried out under full vacuum and sufficient heating to maintain the temperature between 150° and 155° C. until the free phenol content of the product had fallen below 0.1%.

510 parts of the resin so produced were then dissolved in a mixture of 168.7 parts of potassium hydroxide and 473.2 parts of water, to give a molar ratio of phenol:potassium of 1:0.64.

The resin solution so produced was then heated to 65° C. and methylolated by charging 310.4 parts of 50% w/w formaldehyde solution over 15 minutes, while holding the temperature below 67° C. throughout the addition. The product was then maintained at 65°-68° C. for a further 130 minutes. During this period, samples were removed at intervals and the viscosities measured.

After 10 minutes, viscosity at 25° C.: 190 cP (Example 1).

After 55 minutes, viscosity at 25° C.: 320 cP (Example 2).

After 120 minutes, viscosity at 25° C.: 380 cP (Example 3).

COMPARATIVE EXAMPLE

Manufacture of a Conventional Alkaline Phenolic Resole Resin

A conventional alkaline phenolic resole resin, typical of those available commercially, was prepared as follows:

100% phenol was dissolved in 50% aqueous potassium hydroxide solution in an amount corresponding to a molar ratio (KOH:phenol) of 0.64:1 and 50% formaldehyde solution, in an amount equal to a molar ratio (phenol:formaldehyde) of 1:1.7, added slowly while maintaining the temperature below 65° C. The temperature was then increased gradually to 100° C. and the reaction mixture maintained under reflux until it attained a viscosity of 900 centipoises at 25° C. The resin solution so formed was then cooled to 40° C. and 3.77 parts of industrial methylated spirits, 1 part of 40% sodium ethyl hexyl sulphate solution and 0.38 parts of gamma-aminopropyl-triethoxy silane were added for every 94.5 parts of resin solution.

For the purpose of testing, compression test specimens were made with the various resin compositions as follows:

1000 g of Chelford 50 silica sand (where 50 is the AFS fineness number) at 18° C. were charged into a Ridsdale laboratory core sand mixer. 15 g of a mixture of gamma-butyrolactone (40 parts) and triacetin (60 parts) were charged and mixed for 30 seconds. 15 g of the resin under test were then added and mixed for 1 minute. The mix was then discharged and immediately made into AFS compression test specimens using a standard rammer and precision tubes. (The test specimens are cylinders 2 inches in diameter and 2 inches high, rammed three times with a 14 pound weight dropped through 2 inches). The results are shown in Table 1.

To 98.45 parts of each of the methylolated acid-catalysed novolak resins, 3.77 parts of industrial methylated spirits and 0.38 parts of gamma-aminopropyltriethoxy silane were added to reduce the viscosity and improve bond strength to silica surfaces and the products tested as foundry core binders, in comparison with a conventional alkaline phenolic resole resin composition.

The results are shown in Table 1.

TABLE 1

| Resin | Example 1 | Example 2 | Example 3 | Comparative Example |
|---|---|---|---|---|
| Sand | Chelford 50 | | | |
| % Resin on sand | 1.5 | | | |
| Hardener | Gamma-butyrolactone 40/Triacetin 60 | | | |
| % Hardener on resin | 20 | | | |
| Sand temperature | | | | |
| before mixing | 17.5 | 17.5 | 18 | 18 |
| after mixing | 18 | 18 | 18.5 | 18.5 |
| Bench life (minutes) | 12 | 10 | 8-9 | 13 |
| Set time (minutes) | 19 | 15 | 13 | 20 |
| Compressive strength kN/m$^2$ | | | | |
| After ¼ hour | 250 | 1085 | 1235 | 200 |
| After 1 hour | 1925 | 2370 | 2615 | 1380 |

TABLE 1-continued

| Resin | Example 1 | Example 2 | Example 3 | Comparative Example |
|---|---|---|---|---|
| After 2 hours | 2715 | 3155 | 3155 | 2220 |
| After 24 hours | 4785 | 5575 | 5330 | 4245 |

No sticking problems were encountered with Examples 1 to 3. There was some sticking in the case of the resin of the comparative example.

EXAMPLES 4–7

A salicylic acid/sulphuric acid novolak resin was prepared as described above in Examples 1–3 and steam distilled to remove unreacted phenol. Samples of the resin were removed prior to steam distillation and at intervals during the distillation process and the residual free phenol measured. Each of these samples was then made alkaline by adding potassium hydroxide in an amount sufficient to provide a phenol:potassium ratio of 1:0.64 and reacted with formaldehyde in an amount sufficient to provide a P:F ratio of 1:1.7.

As in the foregoing examples, 3.77 parts of industrial methylated spirits and 0.38 parts of gamma-aminopropyl-triethoxy silane were added to 98.45 parts of each of the methylolated novolak resins, in order to reduce the viscosity and improve the bond strength to silica surfaces. The products were then tested as foundry core binders, in comparison with a conventional alkaline phenolic resole resin composition. The results are shown as Examples 4 to 6 in Table 2, which also includes a similar resin in which the phenol content of the novolak base had been reduced to essentially 0% prior to the methylolation step (Example 7).

TABLE 2

| | Example 4 | Example 5 | Example 6 | Example 7 |
|---|---|---|---|---|
| Free phenol in novolak base | above 16% | 9.1% | 2.1% | 0% |
| Sand | Chelford 50 | | | |
| % Resin on sand | 1.5 | | | |
| Hardener | Gamma-butyrolactone 40/Triacetin 60 | | | |
| % Hardener on resin | 20 | | | |
| Sand temperature | | | | |
| before mixing | 17.5 | 17.5 | 18 | 18 |
| after mixing | 18 | 18 | 18.5 | 18.5 |
| Set time (minutes) | 15 | 13½ | 10 | 10 |
| Viscosity (cSt) | 110 | 166 | 220 | 132 |
| Compressive strength kN/m² | | | | |
| After 1 hour | 1725 | 2170 | 2615 | 2615 |
| After 2 hours | 2320 | 2515 | 2960 | 3155 |
| After 24 hours | 4145 | 4685 | 4785 | 5330 |

A conventional resole (the comparative example in Table 1) was tested as a comparison, both prior to and after ageing, and shows that similarly high final strengths are not simply a result of setting time or viscosity effects. The results are set out in Table 3.

TABLE 3

| Comparison test | Resole prior to ageing | Resole after ageing |
|---|---|---|
| Set time (minutes) | 14 | 11½ |
| Viscosity (cSt) | 138 | 174 |
| Compressive strength kN/m² | | |
| After 1 hour | 1480 | 1625 |
| After 2 hours | 2220 | 2565 |
| After 24 hours | 3945 | 3650 |

No sticking problems were encountered with Examples 4–7. There was some sticking in the case of the comparison examples.

The resins of Examples 4–6 were further tested for use with methyl formate in a gassing process for the manufacture of foundry moulds and cores as described in our European Patent 0086615. These were compared both with the conventional resin as described above (Resin A) and with a phenolic resole (Resin B, P:K=1:0.76, P:F=1:2.0) sold commercially for this process. The results are shown in Table 4.

Although the strengths achieved with the resin of the invention are less markedly superior in this case, they are achieved at a lower P:K ratio and a lower P:F ratio, both of which are desirable.

TABLE 4

| | Example 4 | Example 5 | Example 6 | Resin A | Resin B |
|---|---|---|---|---|---|
| Free phenol in Sand | above 16% | 9.1% | 2.1% | — | — |
| Sand | | Sigrano 75 | | | |
| % Resin on sand | | 1.8 | | | |
| Hardener | | Methyl formate | | | |
| Viscosity (cSt) | 110 | 166 | 220 | 138 | 175 |
| Flexural strength kg/cm² | | | | | |
| Immediate | 12.2 | 15.7 | 18.3 | 5.7 | 16.7 |
| After 24 hours | 24.7 | 27.7 | 29 | 14 | 27.7 |

EXAMPLE 8

Manufacture of Oxalic Acid Catalysed Resin

An oxalic acid catalysed novolak resin was prepared by reacting phenol and formaldehyde (as 50% formaldehyde solution) in a molar ratio (P:F) of 1:0.5 in the presence of 2.3% oxalic acid (based on the weight of phenol). Vacuum distillation was employed to remove water and the free phenol content then reduced to 0.72% by steam distillation.

The product (Novolak Base A) was then methylolated under alkaline conditions as described for Examples 1–3 above.

The product had a final molar ratio (P:F) of 1:1.7 and a viscosity of 134 centistokes at 25° C.

This product was then tested for compressive strength using a composition as in Table 2 and for flexural strength when gassed with methyl formate as in Table 4, to give the following results (in Table 5):

TABLE 5

| Compressive strength kN/m² | |
|---|---|
| After 1 hour | 2515 |
| After 2 hours | 3060 |
| After 24 hours | 5130 |
| Flexural strength kg/cm² | |
| Immediate | 22 |
| After 24 hours | 37 |

As can be seen from Table 5, the flexural strengths obtained when gaseous methyl formate is used as the curing agent, are substantially greater than those obtained with resole resins from which the low molecular weight material has not been removed.

Although the products of the invention are illustrated primarily in relation to foundry mould and cores manufacture, they are also useful in many other areas where phenolic resins are conventionally employed.

EXAMPLE 9

Casting Resins

Samples of the resin of Example 3 above and of the comparison resin (Comparative Example above) were also mixed with 20 parts of triacetin per 100 of resin, cast in the form of blocks and allowed to stand at 20° C. The hardness was measured at intervals using a Shore "D" hardness meter and the results are shown in Table 6.

As can be seen from these results (and also those on the foundry cores described above), the rate of development of strength and hardness is markedly superior in the case of the products in accordance with the invention.

TABLE 6

| Hardness Values (Shore 'D') | | | |
|---|---|---|---|
| Resin Example 3 - Hardener (triacetin) | 100 parts 20 parts | Comparison resin - | 100 parts 20 parts |
| After 30 minutes | 29 | | 16 |
| After 1 hour | 34 | | 22 |
| After 1½ hours | 46 | | 30 |
| After 24 hours | 57 | | 45 |

EXAMPLE 10

Use in Laminates

Glass cloth laminates were prepared using the acid catalysed novolak of Example 3 with 20 parts of triethylene glycol diacetate per 100 parts of resin. These were compared with similar laminates made using the conventional alkaline phenolic resole resin employing the same amount and type of catalyst. In both cases the laminate comprised 48% glass and 52% resin composition. The flexural strength of the laminates was measured after standing for 3 days at room temperature and gave the following results:
Resin of Example 3—54.2 MN/m$^2$
Conventional resole—39.8 MN/m$^2$

EXAMPLE 11

Use as a Carbonisable Binder

Surprisingly, we have found that the ester-cured methylolated novolak resins of the present invention exhibit greater resistance to oxidation than conventional resoles, making them particularly suitable for bonding refractory carbon articles.

The attached drawing (FIG. 1) shows the mogravimetric curves of a carbon test specimen made using the resin of Example 3 as the binder and a comparable specimen employing a conventional resole (Resin A above). A curve showing weight loss under nitrogen and one showing weight loss in air with increasing temperature is shown for each resin. It can be seen that the resin in accordance with the invention exhibits a very much less marked drop when heated in air than the ester-cured resole of the prior art (Resin A), indicating a greater resistance to oxidation.

EXAMPLE 12

Use as a Wood Adhesive

A composition according to the present invention was also tested as a wood adhesive, using 1 inch wide beech test pieces, as defined in British Standard 1204.

For this purpose, 33 parts of the steam distilled oxalic acid as described above (Novolak Base A of Example 8 above) were dissolved in 22 parts of 50% potassium hydroxide solution. 19.5 parts of water were added and the temperature raised to 65° C. 20.75 parts of 50% formalin were then added and the temperature maintained at 65° C. until a viscosity of 300 cP at 25° C. was reached. The resin was then cooled and 3% of denatured ethanol, 1% of a 40% solution of ethyl hexyl sulphate and 0.4% of gamma isopropyl triethoxysilane were then added. The resultant product (Resin I) had a solids content of 56% (3 hours at 100° C.) and a viscosity of 120 centistokes at 25° C.

This product was then employed to make a glue mix as follows:

| | |
|---|---|
| Resin I | 100 parts |
| Triethylene glycol diacetate | 15 parts |
| 1:3 butylene glycol diacetate | 10 parts |
| Wood flour 200 mesh | 5 parts |
| China clay | 5 parts |

This glue mix had a useable life of approximately 40 minutes at 20° C.

A test to BS. 1204 (Close contact) was carried out using a conventional ester-cured phenolic (Resin A—prepared as described in Comparative Example above) as a comparison and gave the following results: (Figures in KN).

| GLUE MIX USING | DRY | COLD SOAK | 3 h BOIL | 6 h BOIL |
|---|---|---|---|---|
| Resin I (invention) | 4.12 | 1.87 | 1.87 | 1.97 |
| Resin A (comparative) | 2.83 | 1.59 | 1.88 | 2.01 |
| Specification minimum | 2.2 | 2.2 | 1.1 | 1.45 |

Although neither resin met the minimum requirements of BS. 1204 in the cold soak test, the test shows the advantage of the resin of the present invention over an ester-cured phenolic resin of conventional type.

EXAMPLE 13

Manufacture of an Acid-catalysed Phenolic Novolak Resin 3340 parts of 100% phenol were charged to a jacketted vessel equipped with stirrer, reflux and distillate condensers, steam heating, water cooling and vacuum and heated under reflux to 80° C. 79 parts of oxalic acid dissolved in 235 parts of water were then added. 1066 parts of 50% w/w aqueous formaldehyde solution were then introduced slowly over 90 minutes, while maintaining reflux conditions at atmospheric pressure, using a minimum of steam in the later stages to maintain gentle reflux. After completion of the formaldehyde addition, steam was supplied to the vessel to maintain gentle refluxing for a further 90 minutes.

Distillate was then removed at atmospheric pressure until the temperature rose to 140° C.

Vacuum was then gradually applied, building up to 28 inches of mercury (−980 mbar guage) while maintaining full steam heating. These conditions were maintained until the temperature reached 150° C. and were then held for a further 15 minutes.

Steam distillation was then carried out under full vacuum and sufficient heating to maintain the temperature between 150° and 155° C. until the free phenol content of the product had fallen below 1.0%.

1525 parts of water were then added gradually under reflux to disperse and dissolve the resin and the mixture cooled to below 80° C. 1626 parts of potassium hydroxide were then added, after which the mixture was further cooled to 60°-65° C. 1434 parts of 50% formaldehyde solution were then added slowly over a period of 45 to 60 minutes, keeping the temperature below 65° C., in order to methylolate the resin. This temperature was maintained until the viscosity had reached 340-390 centipoises at 25° C.

Finally, 309 parts of 2-phenoxy ethanol and 31 parts of gamma-aminopropyl triethoxy silane were added. This preparation was repeated but, for purposes of comparison the 2-phenoxy ethanol was replaced by an equal weight of butyl carbitol.

By way of additional comparisons, a conventional alkaline phenolic resole resin (prepared according to the Comparative Example described above following Examples 1-3) was prepared containing 4% by weight of butyl carbitol (diethylene glycol monobutyl ether) and an otherwise identical resin was prepared containing 4% by weight of 2-phenoxy ethanol.

The results of flexural strength tests using 1.8% of the various resin compositions on Sigrano sand (AFS No. approximately 75) and gassing with methyl formate, are shown in the following table.

| Binder | Alcohol | Flexural strength kg/cm² | | |
| --- | --- | --- | --- | --- |
| | | Immediate | 1 hour | 24 hours |
| Conventional resole resin | Butyl carbitol | 13 | 19 | 26 |
| Conventional resole resin | 2-phenoxy ethanol | 16 | 24 | 28 |
| Methylolated novolak resin | Butyl carbitol | 20 | 31 | 37 |
| Methylolated novolak resin | 2-phenoxy ethanol | 23 | 37 | 45 |

As can be seen from the table, a combination of the use of a low free-phenol content methylolated novolak resin and an aryloxy alcohol effects a substantial improvement in strength values, giving almost a two-fold increase over a conventional resole resin containing butyl carbitol.

We claim:

1. A phenolic resin composition comprising:
   (1) ester-curable phenol-aldehyde resin in alkaline aqueous solution; and
   (2) an organic ester
wherein said ester-curable phenol-aldehyde resin is a methylolated phenolic novolak resin.

2. A composition according to claim 1, in which the methylolated phenolic novolak resin is obtained by subjecting a phenolic novolak resin from which unreacted phenol has been removed to a methylolation reaction.

3. A composition according to claim 2, wherein the phenolic novolak resin, prior to the methylolation, is subjected to a steam distillation treatment in order to remove unreacted phenol.

4. A composition according to claim 1, wherein the methylolated phenolic novolak resin is a methylolated phenol-formaldehyde novolak resin.

5. A composition according to claim 2, wherein the methylolated phenolic novolak resin is a methylolated phenol-formaldehyde novolak resin.

6. A composition according to claim 3, wherein the methylolated phenolic novolak resin is a methylolated phenol-formaldehyde novolak resin.

7. A composition according to claim 4, wherein the methylolated phenol-formaldehyde novolak resin is prepared by methylolating an acid-catalysed phenol-formaldehyde novolak resin wherein the molar ratio of phenol:formaldehyde is in the range of 1:0.3 to 0.88.

8. A composition according to claim 5, wherein the methylolated phenol-formaldehyde novolak resin is prepared by methylolating an acid-catalysed phenol-formaldehyde novolak resin wherein the molar ratio of phenol:formaldehyde is in the range of 1:0.3 to 0.88.

9. A composition according to claim 6, wherein the methylolated phenol-formaldehyde novolak resin is prepared by methylolating an acid-catalysed phenol-formaldehyde novolak resin wherein the molar ratio of phenol:formaldehyde is in the range of 1:0.3 to 0.88.

10. A composition according to claim 4, wherein the methylolated phenol-formaldehyde novolak resin is prepared by methylolating a high ortho novolak resin wherein the molar ratio of phenol:formaldehyde is in the range of 1:0.3 to 0.72.

11. A composition according to claim 5, wherein the methylolated phenol-formaldehyde novolak resin is prepared by methylolating a high ortho novolak resin wherein the molar ratio of phenol:formaldehyde is in the range of 1:0.3 to 0.72.

12. A composition according to claim 6, wherein the methylolated phenol-formaldehyde novolak resin is prepared by methylolating a high ortho novolak resin wherein the molar ratio of phenol:formaldehyde is in the range of 1:0.3 to 0.72.

13. Method of using the methylated phenolic novolac resin in alkaline aqueous solution as an ester-curable phenolic resin component in a hardenable composition wherein said phenolic resin component is curable by reaction with an organic ester and wherein said phenolic resin is obtained by subjecting phenolic novolak resin from which unreacted phenol has been removed to a methylolation reaction.

14. The use according to claim 13 of a methylolated phenol-formaldehyde novolak resin in alkaline aqueous solution.

15. A foundry moulding composition comprising a mixture of
   (1) particulate refractory material; and
   (2) methylolated phenolic novolak resin in alkaline aqueous solution
wherein said composition is hardenable upon reaction of said methylolated phenolic novolak resin with a curing agent, wherein said curing agent comprises an organic ester, and wherein said methylolated phenolic resin is obtained by subjecting a phenolic novolak resin from which unreacted phenol has been removed to a methylolation reaction.

16. A foundry moulding composition according to claim 15, wherein the organic ester is a liquid ester.

17. A foundry moulding composition according to claim 15, wherein the organic ester is methyl formate vapour.

18. A method of making a foundry sand mould or core comprising:
   (1) mixing together sand, methylolated phenolformaldehyde novolak resin in alkaline aqueous solution and liquid ester curing agent for the resin;
   (2) forming the mixture into the shape of the mould or core; and
   (3) allowing the mixture to harden,
wherein said methylolated phenolic resin is obtained by subjecting a phenolic novolak resin from which unreacted phenol has been removed to a methylolation reaction.

19. A method of making a foundry sand mould or core comprising;
   (1) mixing together sand and a hardenable binder wherein said binder comprises methylolated phenol-formaldehyde novolak resin in alkaline aqueous solution;
   (2) forming the mixture of step (1) into the shape of the mould or core; and
   (3) contacting said shape with vapour of methyl formate to cure said resin and thereby cause said shape to harden,
wherein said methylolated phenolic resin is obtained by subjecting a phenolic novolak resin from which unreacted phenol has been removed to a methylolation reaction.

20. A method according to claim 19, wherein the binder comprises a methylolated phenolic novolak resin in alkaline solution and from 1 to 20% by weight based on the weight of the resin of an aryloxy alcohol.

21. A method according to claim 20, wherein the aryloxy alcohol is present in an amount of from 2 to 10% by weight based on the weight of the resin.

22. A method according to claim 20, wherein the aryloxy alcohol is 2-phenoxyethanol.

23. A method according to claim 21, wherein the aryloxy alcohol is 2-phenoxyethanol.

24. A phenolic resin composition suitable for curing by gassing with volatile organic ester comprising:
   (1) methylolated phenolic novolak resin in alkaline aqueous solution; and
   (2) from 1 to 20% based on the weight of the methylolated novolak resin of an aryloxy alcohol.

25. A composition according to claim 24, in which the methylolated phenolic novolak resin is obtained by subjecting a phenolic novolak resin from which unreacted phenol has been removed to a methylolation reaction.

26. A composition according to claim 25, wherein the phenolic novolak resin, prior to the methylolation, is subjected to a steam distillation treatment in order to remove unreacted phenol.

27. A composition according to claim 24, wherein the methylolated phenolic novolak resin is a methylolated phenol-formaldehyde novolak resin.

28. A composition according to claim 25, wherein the methylolated phenolic novolak resin is a methylolated phenol-formaldehyde novolak resin.

29. A composition according to claim 26, wherein the methylolated phenolic novolak resin is a methylolated phenol-formaldehyde novolak resin.

30. A composition according to claim 27, wherein the methylolated phenol-formaldehyde novolak resin is prepared by methylolating an acid-catalysed phenol-formaldehyde novolak resin wherein the molar ratio of phenol:formaldehyde is in the range of 1:0.3 to 0.88.

31. A composition according to claim 28, wherein the methylolated phenol-formaldehyde novolak resin is prepared by methylolating an acid-catalysed phenol-formaldehyde novolak resin wherein the molar ratio of phenol:formaldehyde is in the range of 1:0.3 to 0.88.

32. A composition according to claim 29, wherein the methylolated phenol-formaldehyde novolak resin is prepared by methylolating an acid-catalysed phenol-formaldehyde novolak resin wherein the molar ratio of phenol:formaldehyde is in the range of 1:0.3 to 0.88.

33. A composition according to claim 24, wherein the aryloxy alcohol is 2-phenoxyethanol.

34. A composition according to claim 25, wherein the aryloxy alcohol is 2-phenoxyethanol.

35. A composition according to claim 26, wherein the aryloxy alcohol is 2-phenoxyethanol.

36. A composition according to claim 27, wherein the aryloxy alcohol is 2-phenoxyethanol.

37. A composition according to claim 28, wherein the aryloxy alcohol is 2-phenoxyethanol.

38. A composition according to claim 29, wherein the aryloxy alcohol is 2-phenoxyethanol.

39. A composition according to claim 30, wherein the aryloxy alcohol is 2-phenoxyethanol.

40. A composition according to claim 31, wherein the aryloxy alcohol is 2-phenoxyethanol.

41. A composition according to claim 32, wherein the aryloxy alcohol is 2-phenoxyethanol.

42. A foundry moulding composition comprising a mixture of
   (1) particulate refractory material; and
   (2) hardenable binder
wherein said composition is hardenable upon reaction with a curing agent comprising methyl formate vapour, wherein said hardenable binder comprises a methylolated phenolic novolak resin in alkaline solution and from 1 to 20% based on the weight of the resin of an aryloxy alcohol, and wherein said methylolated phenolic novolak resin is obtained by subjecting a phenolic novolak resin from which unreacted phenol has been removed to a methylolation reaction.

43. A composition according to claim 42, wherein the aryloxy alcohol is 2-phenoxyethanol.

* * * * *